United States Patent [19]

Balmer

[11] Patent Number: 5,052,627

[45] Date of Patent: Oct. 1, 1991

[54] SPREADING OF PARTICULATE MATERIAL

[76] Inventor: Charles Balmer, Box 34, Elie, Manitoba, Canada, R0H 0H0

[21] Appl. No.: 527,312

[22] Filed: May 23, 1990

[51] Int. Cl.[5] ............................................. A01C 15/04
[52] U.S. Cl. .................................... 239/655; 239/656; 239/676
[58] Field of Search ............................... 239/654–656, 239/662–664, 670–673, 676, 689

[56] References Cited

U.S. PATENT DOCUMENTS

| | | | |
|---|---|---|---|
| 2,062,294 | 12/1936 | Cary et al. | 239/655 |
| 2,079,061 | 5/1937 | Zuckerman | 239/656 |
| 2,150,767 | 3/1939 | Heim . | |
| 2,923,574 | 2/1960 | Fuss et al. . | |
| 2,946,597 | 7/1960 | Simonsen | 239/656 |
| 2,976,643 | 3/1961 | Chafer . | |
| 3,169,799 | 2/1965 | Puckett et al. . | |
| 3,258,296 | 6/1966 | Funk . | |
| 3,419,221 | 12/1968 | Fyrk | 239/676 |
| 3,568,937 | 3/1971 | Grataloup | 239/655 |
| 3,631,825 | 1/1972 | Weiste | 239/655 |
| 3,643,872 | 2/1972 | Smith | 239/655 |
| 3,675,856 | 7/1972 | Kverneland | 239/654 |
| 3,926,377 | 12/1975 | Johnson | 239/655 |
| 4,024,822 | 5/1977 | Ross et al. | 239/655 |
| 4,162,766 | 7/1979 | Ten Broeck et al. | 239/656 |
| 4,215,824 | 8/1980 | Weiste | 239/655 |
| 4,405,089 | 9/1983 | Taylor | 239/656 |
| 4,475,819 | 10/1984 | Balmer | 239/654 |
| 4,790,484 | 12/1988 | Wall | 2329/655 |
| 4,793,742 | 12/1988 | Strand | 239/655 |
| 4,826,088 | 5/1989 | Balmer | 239/655 |
| 4,852,809 | 8/1989 | Davis et al. | 239/654 |
| 4,886,208 | 12/1989 | Strand | 239/655 |

FOREIGN PATENT DOCUMENTS

| | | |
|---|---|---|
| 424836 | 2/1969 | Australia . |
| 891305 | 1/1972 | Canada . |
| 284449 | 5/1915 | Fed. Rep. of Germany . |
| 1569181 | 5/1969 | France . |
| 683531 | 12/1952 | United Kingdom . |
| 873718 | 7/1961 | United Kingdom . |
| 1435176 | 5/1976 | United Kingdom .......... 239/655 |

OTHER PUBLICATIONS

Brochure of Valmer Airflow Inc. of Canada entitled "Award Winning Granular Applicators" (no date).
Brochure "New Leader Spreaders L-100 Air Attachment" Highway Equipment Co. of Cedar Rapids, Iowa (no date).
Brochure of Tyler of Benson, Minnesota entitled "Fluid Air Precision Placement" (no date).
Brochure of Lor-Al of Benson, MN entitled "Air Flow Turbo XT" (no date).
Brochure of Willmar of Willmar, MN entitled "The Standard" (no date).
Brochure of Lor-Al of Benson, MN entitled "Al Magnum III" ©1989.
Brochure of Soil Tech Inc. of Waconia, MN entitled "Soilection System" (no date).
Brochure of Valmar Airflow Inc. of Canada entitled "500PT Pneumatic Granular Applicator"; ©1989.
Photographs of a Prototype Machine by Valmar from 1988.

Primary Examiner—Andres Kashnikow
Assistant Examiner—Karen B. Merritt
Attorney, Agent, or Firm—Adrian D. Battison; Stanley G. Ade; Murray E. Thrift

[57] ABSTRACT

A pneumatic spreading system for particulate material such as granular fertilizer includes a tank and a pair of booms extending outwardly from the tank for transportation across the ground. A pair of parallel belts lie in the same horizontal plane and carry a metered layers of the material out of one end of the tank adjacent the booms for discharge as a curtain of the material at a discharge end of the belt. The booms each include a plurality of pipes with all of the pipes lying side by side in the same horizontal plane and each pipe including two distribution nozzles forming a split pipe arrangement. A manifold for airflow is positioned between the two booms injecting air into each pipe of both booms. Each pipe includes a feed opening into which the material falls from the discharge end. A guide arrangement in the form of a plurality of funnels is provided between the discharge end and the pipes with the funnels formed from side walls and end walls which are shaped to guide the material to the staggered feed openings of the pipes. Additional materials in particulate or liquid form can be applied onto the belt for simultaneous spreading action.

22 Claims, 6 Drawing Sheets

SPREADING OF PARTICULATE MATERIAL

BACKGROUND OF THE INVENTION

This invention relates to an apparatus for spreading particulate materials which is particularly but not exclusively designed for use in spreading granular fertilizer across the ground for agricultural use.

The application of granular fertilizer to the ground in a broadcasting action is well known and is employed very widely in agricultural practices. In more recent years chemicals have been added to the granular fertilizer generally as a liquid which is mixed with the granular fertilizer. The products thus applied to the ground have significantly enhanced effectiveness and accordingly it has become much more important to ensure accuracy of distribution. Thus a single pass of the machine should have accurately controlled metering so that a required amount of the material can be spread. In addition the material so metered should be accurately spread across the full width of the band covered by the machine. Furthermore the machine should have minimum delay or dwell between the actuation of a change in rate of the metered material, including stopping or start up, and the actual implementation of that rate change in the material as it is broadcast across the ground. With the machine running at 15 mph or higher, even a few seconds delay during which the material moves from the measuring point to the actual distribution point can result in a length of up to 150 feet of inaccurate rate of distribution.

Many devices available in the marketplace at the present time comprise simply a tank within which is mounted a conveyor belt which transports the material out through one end of the tank. A metering gate is provided at the point of exit from the tank so that a certain thickness of the material is carried out on top of the belt. The material is then simply deposited onto a spinner which rotates at high velocity throwing the material out vigorously in different directions. This technique is of course highly inaccurate in that different amounts of material will be spread at different positions across the ground and this technique is therefore basically unacceptable when used with the high technology products available at the present time. It does however retain a significant portion of the market based upon the low price.

The metering system of a device of this type is however well accepted in the trade and the use of a belt which is formed of stainless steel in hinged sections defining pockets in the belt for transporting the material forwardly is well known and well accepted. Belts of this type are of course entirely conventional and widely used.

The advantage of the spinner type device is of course that it is very inexpensive in comparison with more complex pneumatic distribution systems which are also available. One such pneumatic distribution system is shown in U.S. Pat. No. 4,475,819 (Balmer). This device which has led to a highly successful machine sold widely in U.S.A. and Canada includes a hopper within which the material is stored, a conveyor belt of a type described above which moves the material horizontally out of the hopper past a metering gate and discharges it into the lower end of a vertical auger. The auger transports material vertically and then spreads it readily into a number of ducts. An airflow generating in each of the ducts for transporting the material from the spreader assembly to discharge pipes of staggered length which extend outwardly from the spreader along a pair of booms to spread the material in a spread pattern across the ground. This device has been extremely successful but has two disadvantages. Firstly, the distribution system is relatively complex and hence expensive to manufacturer. Secondly, the vertical auger provides a significant dwell time of the material downstream of the metering point as explained above.

A further machine manufactured by New Leader of Cedar Rapids, Iowa is based upon a conventional machine using a spinner but in this case the spinner is replaced by a pair of booms each of which includes approximately nine pipes lying side by side in a horizontal plane and extending outwardly to the sides of the vehicle. The material from the metering belt falls from a discharge end of the belt into a number of cups. From the cups the material falls by gravity through flexible tubes which connect from the cup to the inner end of the pipes of the boom. From studying the brochures it appears that there must be some splitting arrangement since there are only nine cups apparently supplying the total of 18 pipes of the two booms. Air is supplied to the pipes from manifolds which connect to the end of the pipe by similar flexible tubes with the tubes being interleaved with the product supply tubes. This requires therefore tubes of reduced diameter relative to that of the pipes which of course can interfere with the required amount of flow of material and air and provides a horribly complex arrangement of plumbing. Furthermore, the boom height which is necessitated by the construction provided is very low on the order of fifteen inches from the ground which is unacceptable in field use due to the high probability of impact with the ground and due to the poor spread patterns obtained when the spreader nozzle at the outer end of the pipe is too close to the ground.

A further device manufactured by Tyler of Benson, Minn., includes a tank at the forward end of which is mounted a pair of booms with the pipes of each of the booms mounted in a single vertical plane. Above the booms is mounted a distribution box which is fed by an auger from the bottom of the tank so that material is lifted from the tank into the distribution box. Within the box is mounted a pair of belts of the type previously described which move in opposite directions outwardly from the center to the sides of the tank. At the outer sides of each of the belts, the material is discharged from the discharge end of the belt into a plurality of separate cups each of which connects through a flexible hose to a respective one of the pipes of the booms. In addition one of the cups from each side is connected through a long flexible pipe to a spreader at the rear of the vehicle.

This arrangement has achieved some success but retains a significant disadvantage of the complication necessitated by the provision of the auger lifting the material to the distribution box at the top of the tank so that it can fall by gravity into the pipes of the booms. Again, the flexible hoses provide a resistance to flow which significantly reduces the efficiency of the pneumatic transportation. However the metering of the material occurs on the belts just prior to the separation cups and hence the problem of the dwell has been significantly reduced.

A further alternative arrangement is manufactured by Valmar Airflow Inc. of Elie, Manitoba, Canada based upon a design developed by the present inventor. In this arrangement the metering is carried out by metering rollers which are arranged at the front of the tank and which discharge the material from the front of the tank into a plurality of cups. Each cup is connected with a venturi supplied with air from a manifold so that the material fed into the cup is injected into a flexible hose which extends from the front of the tank to the rear of the tank for communication with a respective one of the separate pipes of a pair of booms mounted at the rear of the tank. The booms are mounted with the pipes in vertical planes with the lifting of the material from the bottom of the tank to the height of the pipes of the booms being effected by the pneumatic transport which is relatively inefficient. This device is thus relatively complex and has low pneumatic efficiency and accordingly the disadvantages have limited the number of sales.

A further prototype device which has been sold in U.S.A. in very limited numbers and manufactured by Valmar under a further design of the present inventor is based upon the above-mentioned machine. However in this case both the metering and the booms are mounted at the rear of the tank. In addition the booms are mounted in a horizontal plane at the height of the bottom of the tank. A separate metering section is mounted at the rear of the tank and is fed by an auger system at the bottom of the tank which transports the material from the tank into the separate metering section under the control of a level detection switch within the metering section. The metering is carried out by a pair of rollers with the axes of the rollers parallel to the direction of movement of the vehicle, that is at right angles to the booms. The metering rollers thus meter the material out of the separate metering section directly into feed cups mounted on the pipes of the boom.

This device has been found to be impractical from a commercial point of view in view of the high complexity of the separate metering system and the low performance of the metering rollers which cannot provide the high variation in rate which is necessary for granular distribution systems of this type. This design has therefore been abandoned.

Other metering roller systems of a similar design to that of the above prototype are currently available from European manufacturers in which the material is metered by rollers with each roller being associated with a respective one of the booms. The rollers thus meter directly downwardly into the pipes of the booms which lie in a horizontal plane. As stated above this arrangement is unsatisfactory in that the metering rollers cannot provide the high variation in rates necessary, in that the metering rollers system has difficulty in accommodating the injection or application of liquid chemicals onto the granular fertilizer material and in that the system is relatively complex and therefore expensive.

Example of this prior European type system are Shown in U.S. Pat. No. 3,568,937 (Grataloup) and British Patent 1435176 (Amazonen).

A technique by which each duct or pipe of a boom is split to provide material to two separate spreader nozzles is shown in prior U.S. Pat. No. 4826088 of the present inventor.

Recapping, therefore, the currently available pneumatic devices for spreading of particulate material are generally unsatisfactory due to the high complexity and necessarily therefore a relatively high cost, due to the inadequacies of the roller metering system and due to the use with the belt metering system of flexible tubing which interferes with the efficiency of the pneumatic transportation and can introduce inaccuracies into the spread patterns generated by the machine.

SUMMARY OF THE INVENTION

It is one object of the present invention, therefore, to provide an improved pneumatic distribution system which is relatively simple and economic to manufacture, which uses a belt metering system, which avoids the delay or dwell period subsequent to metering and prior to actual distribution to the ground and which provides a high efficiency of pneumatic transportation.

It is a further object of the present invention to provide an improved pneumatic distribution system which allows the introduction of additional materials for spreading in conjunction with a main material.

According to a first aspect of the invention, therefore, there is provided an apparatus for spreading particulate material across the ground, comprising a tank for containing the material to be spread, a first boom and a second boom, each boom extending from a central position adjacent one end of the tank outwardly to a respective side of the tank, each boom including a plurality of pipes lying side by side in a common plane which is substantially horizontal, each pipe extending from an inner end adjacent the central position to an outer end spaced outwardly of the central position and having spreader means spaced outwardly from the central position for spreading across the ground the particulate material transported along the pipe, means for mounting the tank and the booms for movement in a direction substantially at right angles to the booms across the ground, the spreader means being located at staggered positions along the length of the booms such that the spreader means cooperate to spread the material across the full width of the boom as the booms are moved across the ground, a first and a second endless feed belt means each having an upper run mounted within the tank such that the particulate material is carried on the upper run of the belt means from the tank in a layer on top of the upper run, means mounting the belt means such that the upper runs thereof lie in substantially the same horizontal plane for movement in mutually parallel directions outwardly from the tank at said one end thereof and at right angles to said booms, gate means for controlling the depth of the layer on the belt means so as to meter the amount of material carried thereby, each of said belt means having an end guide member at a discharge end of the belt means around which the upper run thereof turns to discharge the material to fall therefrom by gravity, each boom being associated with a respective one of the belt means so as to receive the particulate material deposited therefrom, fan means for generating airflow, manifold means communicating airflow from the fan means to each pipe for causing an airflow therealong from the inner end thereof to the spreader means for transportation of the particulate material therealong, each of the pipes of a respective one of the booms having a feed opening for receiving particulate material from the discharge end of the respective belt means, for each of the booms, the feed openings of the pipes thereof being staggered in a direction parallel to the discharge end of the respective belt means so as to receive material from separate parts of the respective belt means, and first and second guide means each for transferring the material from the discharge end of respective one of the belt means to the feed openings of respective one of the booms, each guide means comprising a plurality of rigid duct members arranged side by side across the width of the discharge end, each duct member communicating material directly to the feed opening of a respective one of the pipes and being formed by two side dividing walls separating each duct member from the next adjacent duct member and two end walls, the side dividing walls and end walls defining at an upper end of the duct member an open mouth into which the material falls from a discharge end, the side walls being arranged in spaced relation transversely to the discharge end so that the discharged material is divided into separate portions for transmission to the pipes, the end walls of each duct member including at least one end wall which is inclined to the vertical to guide the separate portion of material from a position directly beneath the discharge end to a position aligned with the feed opening of the respective pipe.

According to a second aspect of the invention, there is provided an apparatus for spreading particulate material across the ground, comprising a tank for containing the material to be spread, a first boom and a second boom, each boom extending from a central position adjacent one end of the tank outwardly to a respective side of the tank, each boom including a plurality of pipes lying side by side in a common plane which is substantially horizontal, each pipe extending from an inner end adjacent the central position to an outer end spaced outwardly of the central position and having spreader means spaced outwardly from the central position for spreading across the ground the particulate material transported along the pipe, means for mounting the tank and the booms for movement in a direction substantially at right angles to the booms across the ground, the spreader means being located at staggered positions along the length of the booms such that the spreader means cooperate to spread the material across the full width of the booms as the booms are moved across the ground, endless feed belt means having an upper run mounted within the tank such that the particulate material is carried on the upper run of the belt means from the tank in a layer on top of the on top of the upper run, gate means for controlling the depth of the layer on the belt means so as to meter the amount of material carried thereby, said belt means having an end guide member at a discharge end of the belt means around which the upper run thereof turns to discharge the material to fall therefrom by gravity, fan means for generating airflow, manifold means communicating airflow from the fan means to each pipe for causing an airflow therealong from the inner end thereof to the spreader means for transportation of the particulate material therealong, each of the pipes of a respective one of the booms having a feed opening for receiving particulate material from the discharge end of the belt means, and means for spreading onto the belt across the width of the belt downstream of the gate means a supplementary material for spreading into said particulate material.

According to a third aspect of the invention there is provided apparatus for spreading particulate material across the ground, comprising a tank for containing the material to be spread, a first boom and a second boom, each boom extending from a central position adjacent one end of the tank outwardly to a respective side of the tank, each boom including a plurality of pipes lying side by side in a common plane which is substantially horizontal, each pipe extending from an inner end adjacent the central position to an outer end spaced outwardly of the central position and having spreader means spaced outwardly from the central position for spreading across the ground the particulate material transported along the pipe, means for mounting the tank and the booms for movement in a direction substantially at right angles to the booms across the ground, the spreader means being located at staggered positions along the length of the booms such that the spreader means cooperate to spread the material across the full width of the booms as the booms are moved across the ground, a first and a second endless feed belt means each having an upper run mounted within the tank such that the particulate material is carried on the upper run of the belt means from the tank in a layer on top of the upper run, means mounting the belt means such that the upper runs thereof lie in substantially the same horizontal plane for movement in mutually parallel directions outwardly from the tank at said one end thereof and at right angles to said booms, gate means for controlling the depth of the layer on the belt means so as to meter the amount of material Carried thereby, each of said belt means having an end guide member at a discharge end of the belt means around which the upper run thereof turns to discharge the material to fall therefrom by gravity, each boom being positioned directly beneath the discharge end of a respective one of the belt means so as to receive the particulate material deposited therefrom, fan means for generating airflow, manifold means communicating airflow from the fan means to each pipe for causing an airflow therealong from the inner and thereof to the spreader means for transportation of the particu-late material therealong, each of the pipes of a respective one of the booms having a feed opening for receiving particulate material from the discharge end of the respective belt means, for each of the booms, means for dividing the discharged material into a plurality of separate portions and first and second guide means each including a plurality of ducts for transferring the separate portions of the material from the discharge end of respective one of the belt means to respective ones of the feed openings of a respective one of the booms.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 3:
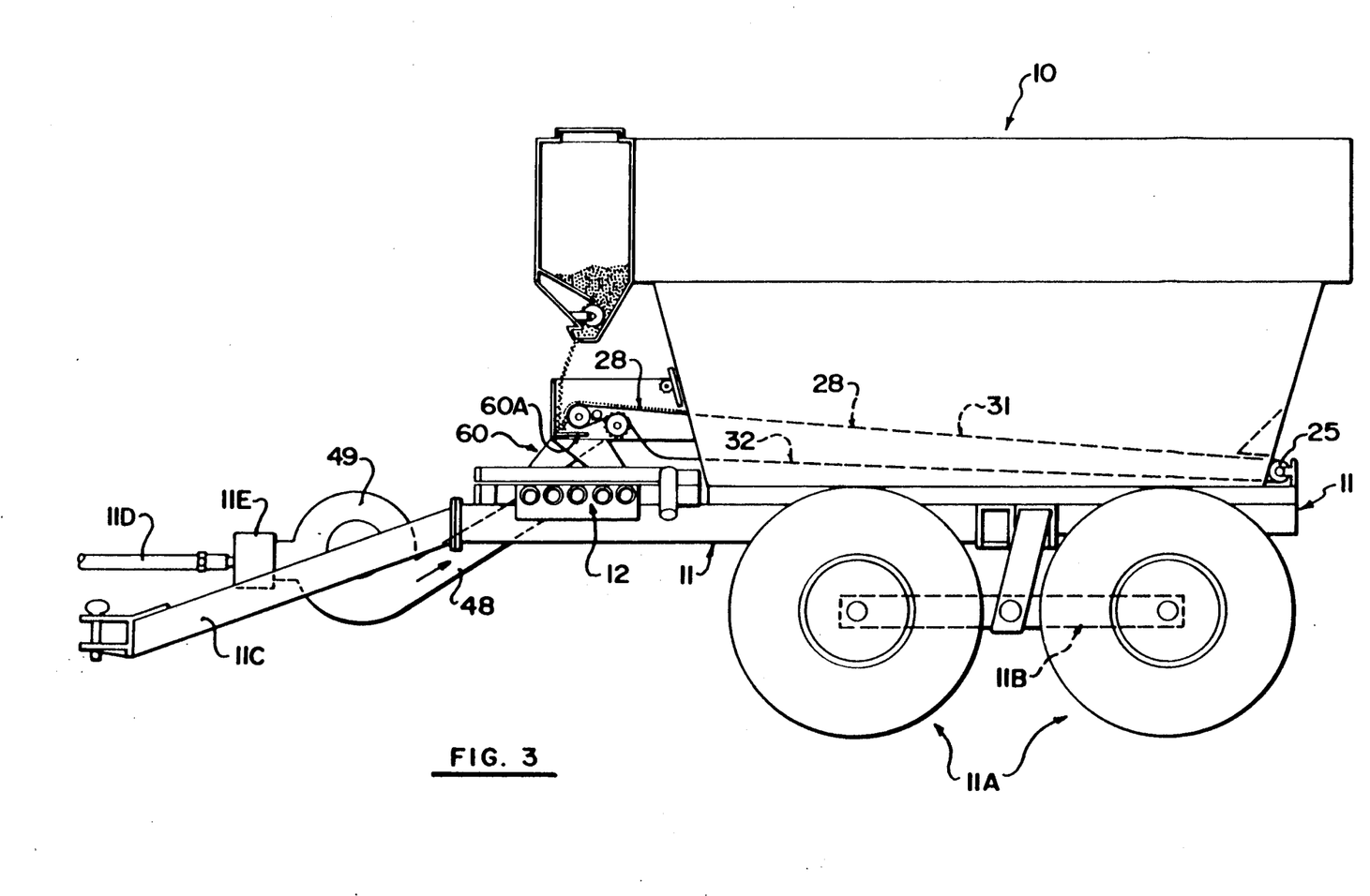
FIG. 3 is a vertical cross-sectional view showing one of the belts and including a hopper for a supplementary material for distribution.

The pneumatic distribution and spreading apparatus shown in the figures comprises a tank 10 of conventional construction for receiving the particulate material to be distributed and spread. The tank is mounted upon a frame 11 for attachment to suitable vehicle which can be either a trailer or a self-propelled vehicle such that the tank can be moved across the ground. The details of the vehicle, the ground wheels associated therewith and the drive mechanism therefor are not important to this invention as these can vary significantly and will be apparent to one skilled in the art. However for completeness a complete pull-type machine is illustrated in FIG. 3 and includes ground wheels 11A mounted on a walking beam 11B supporting the frame 11. A forward end of the frame 11 is attached to a hitch 11C for coupling to a tractor (not shown) including a PTO coupling for PTO shaft 11D and gearbox 11E.

Figure 1:
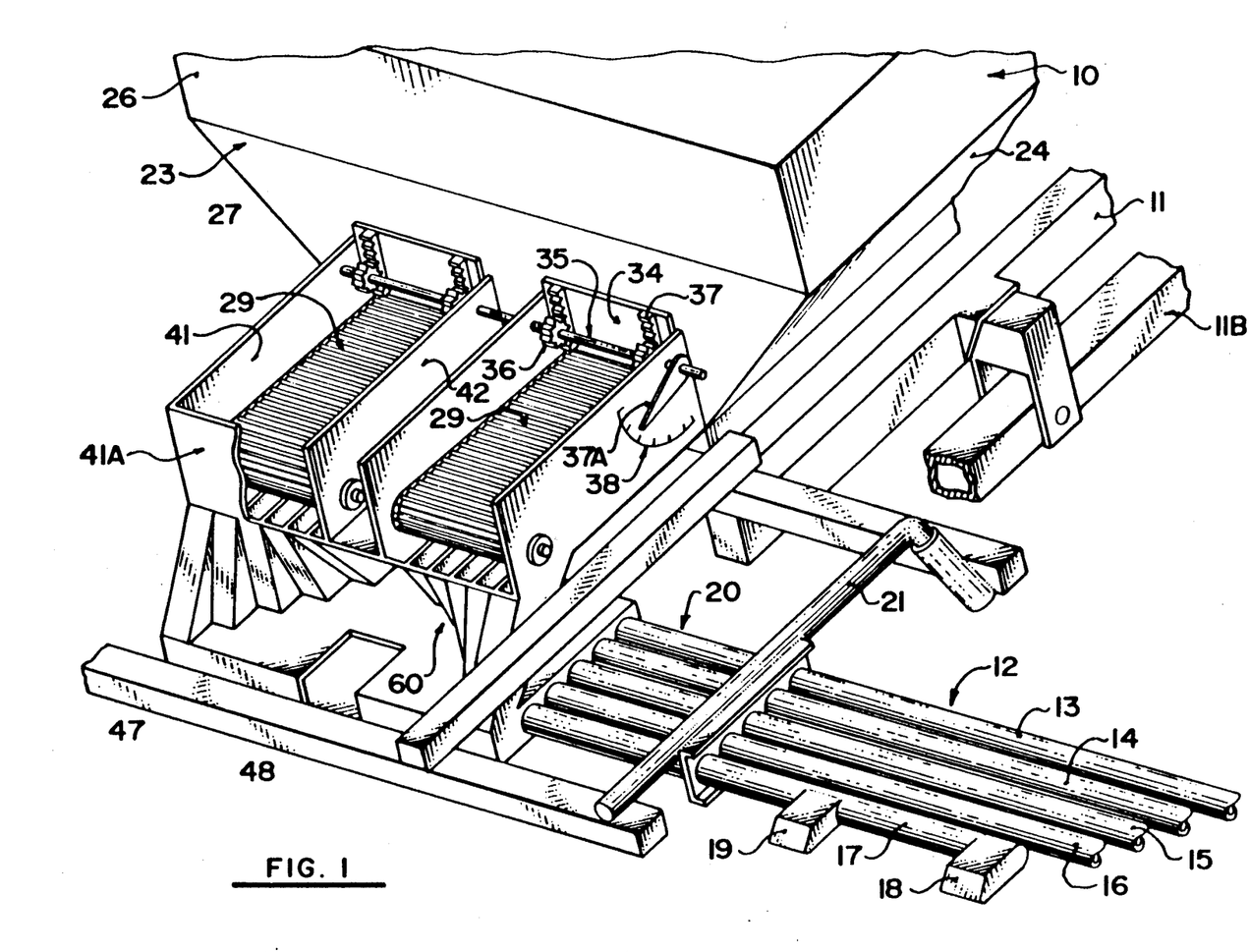
FIG. 1 is an isometric view show in a distribution system according to the present invention with the fan omitted and part of the housing broken away for convenience of illustration.
Figure 2:
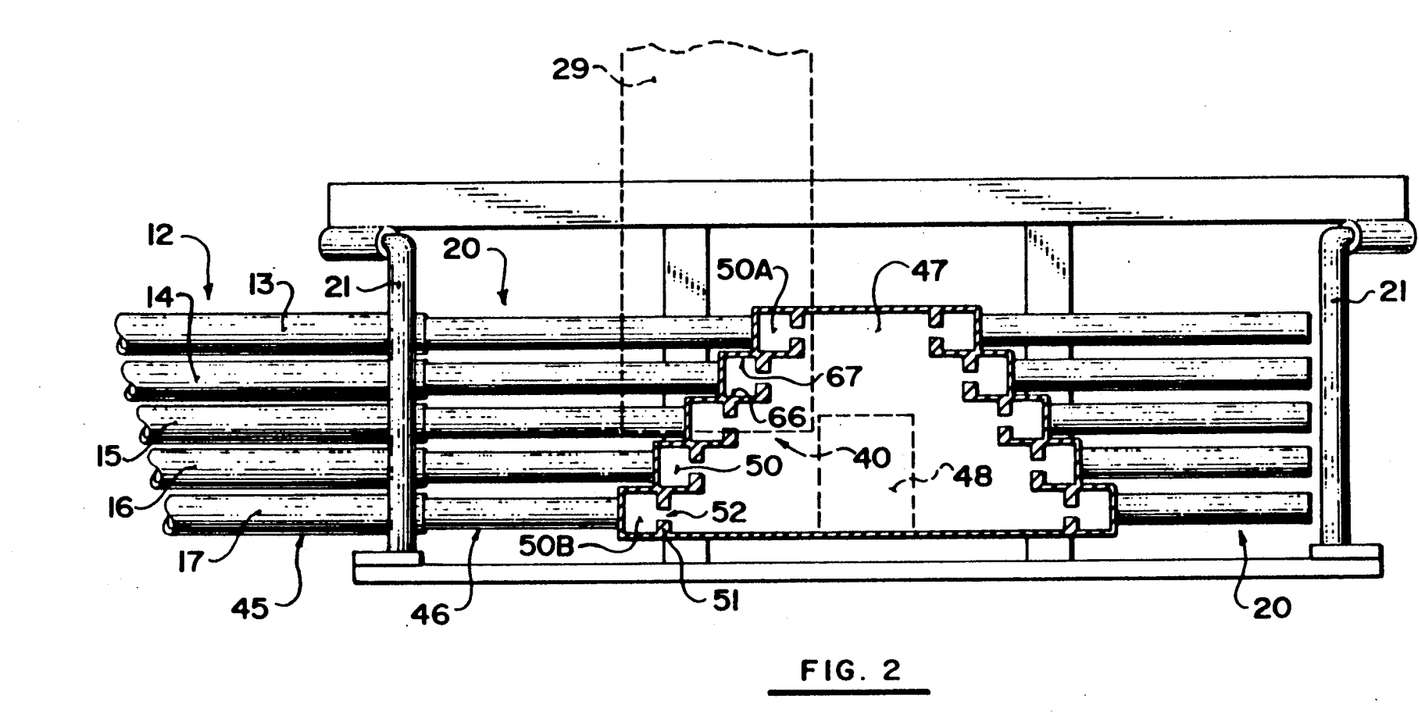
FIG. 2 is a horizontal cross-sectional view taken through the pipes and manifold of the device of FIG. 1.
Figure 6:
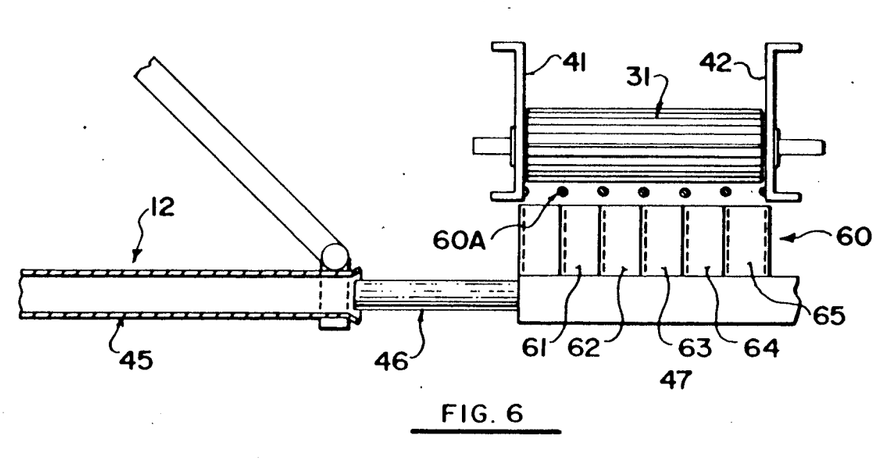
FIG. 6 is a rear elevational view showing a part of one boom and one belt of the device of FIG. 1.

The device further comprises a pair of booms 12 only one of which is visible in FIGS. 1 and 3 but the other of which can be seen in FIG. 2 and 6. Each boom comprises a plurality of pipes 13, 14, 15, 16 and 17 each of which lies in a common horizontal plane of the boom with the pipes arranged side by side and connected together as a common element for projecting out to a respective side of the tank and therefore to a respective side of the vehicle on which the tank is mounted.

Each pipe includes an end spreader nozzle 18 and a second spreader nozzle 19 mounted at a position spaced from the end and arranged to separate from material transported in the pipe one-half of that material for spreading at the position of the second nozzle leaving the remaining material to continue to the end nozzle 18 for spreading from that point. The construction and detail operation of this arrangement of split duct is shown in prior U.S. Pat. No. 4826088 of the present inventor the details of which are incorporated herein by reference.

The remaining pipes extend outwardly beyond the end of the first pipe 17 to staggered positions defining a plurality of spaced nozzles along the length of the boom to an outermost nozzle (not shown) at the end of the pipe 13.

Each of the pipes is divided into a boom portion and an inner portion indicated at 20. The inner portion 20 is fixed relative to the distribution system described hereinafter whereas the boom portions of the pipes are pivotal in a folding action about a support member 21. The support member 21 defines a first pivot axis which is inclined so that the boom as it pivots about the first pivot axis folds upwardly and at the same time twists so the pipes in a folded condition lie along side of the tank. The details of this device are previously known and are not of major importance in the present invention in view of the fact that different folding arrangements can be provided for the boom structure. The boom portion of each of the pipes connects to the inner portion in a manner which allows the material to pass readily without escape of significant amounts of air and without escape of any of the material so that the material can be properly transported from the inner portion to the boom portion by air injected at the inner portion.

Figure 7:
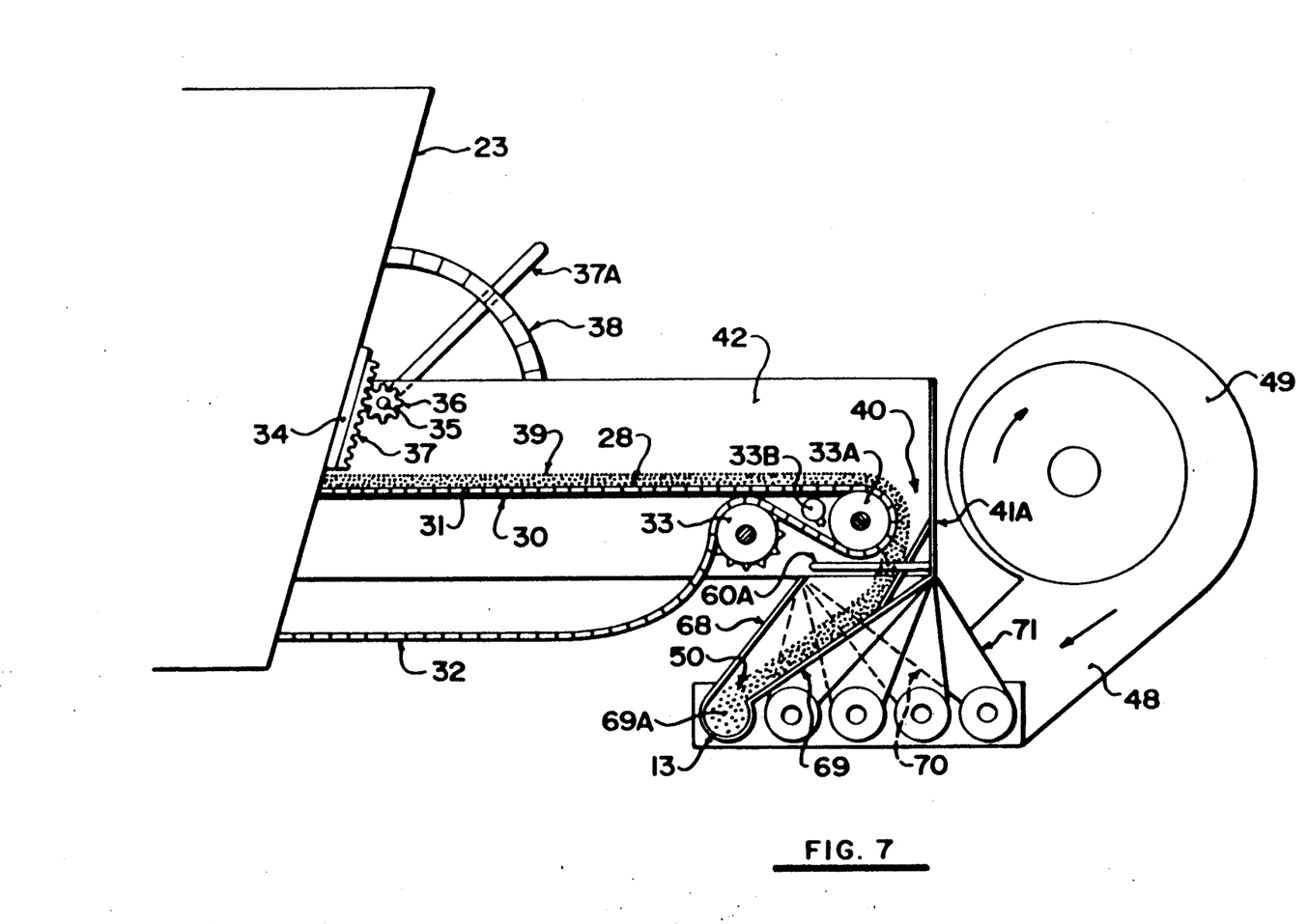
FIG. 7 is a further cross-sectional view similar to that of FIG. 3 showing in more detail the construction of the belt.

Turning now to FIGS. 1 and 7, the tank 10 includes an end wall 23 and two side walls 24. The end wall 23 includes an upper vertical portion 26 and an inclined lower portion 27 which extends downwardly and inwardly to form the conventional conical lower portion of the tank which confines the material to fall downwardly to a substantially flat base. Across the base runs a pair of belts 28 and 29 which run the full length of the tank and act to carry the material from the tank through the end wall 27 for discharge to the booms each of the belts 28 and 29 runs on a plate 30 so that it acts to transport the material forwardly across the plate 30 toward the discharge end of the belt. The belt includes an upper run 31 and a lower run or return run 32 which passes underneath the plate 30 to a re-turn and roller 25. As shown in FIG. 3, the upper run 31 is inclined from the roller 25 adjacent the frame to a forward end which is raised relative to the frame. This acts to lift the forward end to a height above the frame and thus above the boom 12 mounted at the frame. A drive roller 33 is provided adjacent the discharge end of the belt so as to engage the belt and carry it or pull it from the interior of the tank to the discharge end where the material is deposited from the belt and the empty or return run of the belt travels back to collect more material. A guide roller 33A is positioned directly at the discharge end with the drive roller 33 positioned behind the guide roller to pull the belt around the guide roller. The guide roller can thus have a smooth surface and the drive teeth are mounted on the drive roller. The return run can be relatively slack as shown.

The belt is of the type previously described which is conventional in form and includes a plurality of cells formed by upstanding strips of stainless steel which are connected together by pivot pins thus forming a wide band or chain type construction which is self-supporting and can be directly driven by the teeth on the roller 33. The belt thus carries material within the cells defined by the belt and also carries material on top on the belt as controlled by a gate 34 mounted at the exit from the tank. The gate mechanism includes a transverse support rod 35 carrying a pinion 36 rotable to vertically shift a rack 37 attached to the gate or flap 34. The position of the gate or flap 34 relative to rod 35 is controlled by a lever 37A mounted at one end of the rod 35. The lever 37A is manually operable and can be locked at a required position on a gauge 38. The angle of the lever 37A as located by the gauge 38 thus determines the vertical position of the gate 34 and particularly the spacing of the lowermost edge thereof relative to the upper surface of the belt 29. This forms a layer 39 of the material on the belt which is carried out of the tank for discharge at the discharge end 40 of the belt as a curtain of the material falling vertically downwardly from the discharge end. The sides of the belt are confined by vertical side walls 41 and 42 thus forming side edges of the layer 39 so that the exact quantity of material only is carried along the belt for discharge.

An end wall 41A spaced beyond the roller 33A protects the discharging material from wind currents and other interference. The smooth surface of the guide end roller 33A ensures that all the material on and in the belt is carried beyond the periphery of the roller and deposited from that position by gravity in a curtain of the material. An air jet nozzle 33B behind the roller 33A ensures that 11 material in the cells of the belt is discharged and the belt fully cleaned of material.

As shown best in FIG. 6, the outer portion of a boom pipe is indicated at 45, an inner portion of a boom pipe is indicated at 46 and this connects at its inner end to a manifold 47 which is supplied with air by a duct 48 connected to a fan 49 shown in FIG. 7 and in one arrangement of the fan it is mounted above the belts 28 and 29 in the area between the two belts. In a second arrangement shown in FIG. 3, the fan is mounted below the boom and forwardly of the frame 11 to cooperate directly with the gearbox 11E without the necessity for drive belts.

As best shown in FIG. 2, each pipe has at its inner end a feed opening 50 into which feed material from a discharge end 40 of the belt can fall. Thus the boom is positioned at a height approximately 8 inches beneath the discharge end of the belt for gravity feed from the belt into the feed opening 50 of the pipes. An end wall of the pipe at the feed opening includes a venturi 51 having an opening 52 centrally of the venturi connected with the manifold so that pressurized air within the manifold is injected through the venturi as axial jet of air which enters the pipe thus generating a low pressure point at the feed opening 50 for carrying the material entering the feed opening 50 along the pipe for discharge as previously described.

As best shown in FIG. 2 the feed openings of the pipes 13, 14, 15, 16 and 17 are staggered across the width of the belt 29 so that the feed opening 50A of the pipe 13 is arranged at the left hand edge of the belt 29 and the feed opening 50B of the pipe 17 is arranged at the right hand edge of the belt 29. The discharge end 40 of the belt 29 overlies the central pipe 15 so that very approximately the pipe 13 lies the same distance rearwardly of the discharge end 40 as the distance which the pipe 17 lies forwardly of the discharge end 40

Between the discharge end 40 and the feed openings 50 is provided a guide arrangement 60 for transmitting the material directly from a discharge end into the feed openings. The guide arrangements 60 comprises a plurality of duct members or funnels 61, 62, 63, 64 and 65. The guide ducts or funnels are arranged side-by-side and each is defined by a pair of side walls and a pair of end walls which terminate in an upper edge forming a rectangular horizontal open mouth into which the material is discharged from the end 40. Two adjacent such guide members can use a common side wall to ensure minimum thickness of the dividing side wall so that the side walls thus act to receive the falling curtain of material divided into a plurality of separate portions. In this case there are six separate portions with each of the portions being substantially equal as dependent upon the width of the portion of curtain selected from the falling material. To assist in the division of the curtain into separate position equally divided along the length of the curtain, there is provided at the division points a plurality of fingers 60A mounted on the front wall 41A and projecting rearwardly therefrom at a position above the open mouths of the funnels. The fingers can thus be accurately located and accommodate tolerances in the position of the funnels and maintain an accurate division. The divided material then falls into the open mouth of each funnel.

Figure 4:
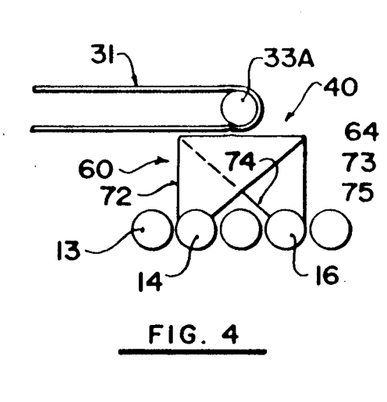
FIGS. 4 and 5 are similar cross-sectional views to that of FIG. 3 showing a part only of the device for showing particularly the shape of the duct members or funnels which guide the material from the discharge end of the belt into the pipes of the boom.
Figure 5:
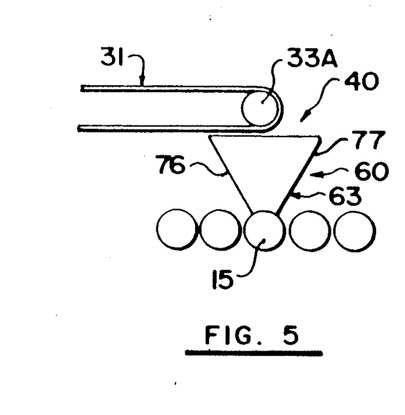

The side walls of each funnel this lie in vertical planes as shown in FIG. 6 and extend vertically downwardly to meet front and rear edges respectively of the feed openings 50. As shown in FIG. 2 the feed openings are substantially rectangular with a front wall 66 and a rear wall 67 and these walls extend vertically upwardly integrally with or meeting the side walls of the funnels. The end walls of the funnels are inclined so as to guide the material to the respective one of the feed openings. Thus in FIG. 7 the end walls of the first funnel are indicated at 68 and 69 and it will be noted that the end walls converge to the feed opening of the pipe 13 with the wall 69 being inclined downwardly and rearwardly so that the material 69A falling from the discharge end 40 impacts upon the upper surface of the wall 69 and then slides down the wall 69 into the pipe 13. The height between the discharge end 40 and the horizontal plane of the booms is selected to be sufficient such that the inclination of the wall 60 is greater than the angle of repose so that the material can readily slide without any collection on the surface of the wall 69. Also in FIG. 7 is indicated the end walls 70 and 71 of the last of the funnels communicating with the pipe 17. In FIG. 4 is indicated the end walls 72 and 73 of the funnel 64 which communicates with the pipe 14. It will be noted that the end wall 73 acts as the guide wall on which the material slides but this has an angle of inclination less than the end wall 69 due to the fact that it needs to reach only back to the pipe 14. Similarly the end walls of the duct 63 are indicated at 74 and 75. The central duct or funnel 63 is shown in FIG. 5 and has end walls 76 and 77 which are substantially symmetrical in view of the fact that the material can fall substantially vertically from the discharge end 40 into the pipe 15.

Thus the discharge end 40 lies parallel to the longitudinal axis of the boom and is turned or guided into the separate horizontal pipes of the boom by the rigid guide structure defined by the separate funnels. This avoids the necessity for any flexible tubing which restricts flow and gives the possibility of collection of material. The provision of the two separate belts and the use of split ducts enables the geometry of the device to accommodate a reasonable height of the tank while at the same time providing a minimum height of the boom which avoids impact with the ground. This geometry also provides opportunity for the fan to be positioned above the boom with the air from the fan entering a single manifold connected directly to both of the booms. As shown in FIG. 2 the shape of the manifold ensures that the maximum amount of air entering the pipes enters the pipes 13 at the best velocity which are the longest pipes with the least velocity entering the pipes 17 which are of course the shortest pipes and thus require less air velocity for transportation.

FIG. 4 shows five ducts each for communicating with respective one of the five pipes of the boom 12. In addition at the right hand end there is shown an additional duct which connects with a pipe for discharge of material at a position directly aligned with the belt. This provides further nozzles adjacent the center of the vehicle which provide a spread pattern across the full width of the vehicle. This pipe is not visible in the other drawings and the shape and arrangement of the duct communicating from the discharge area 40 to the additional pipe is not important in the present invention.

Figure 8:
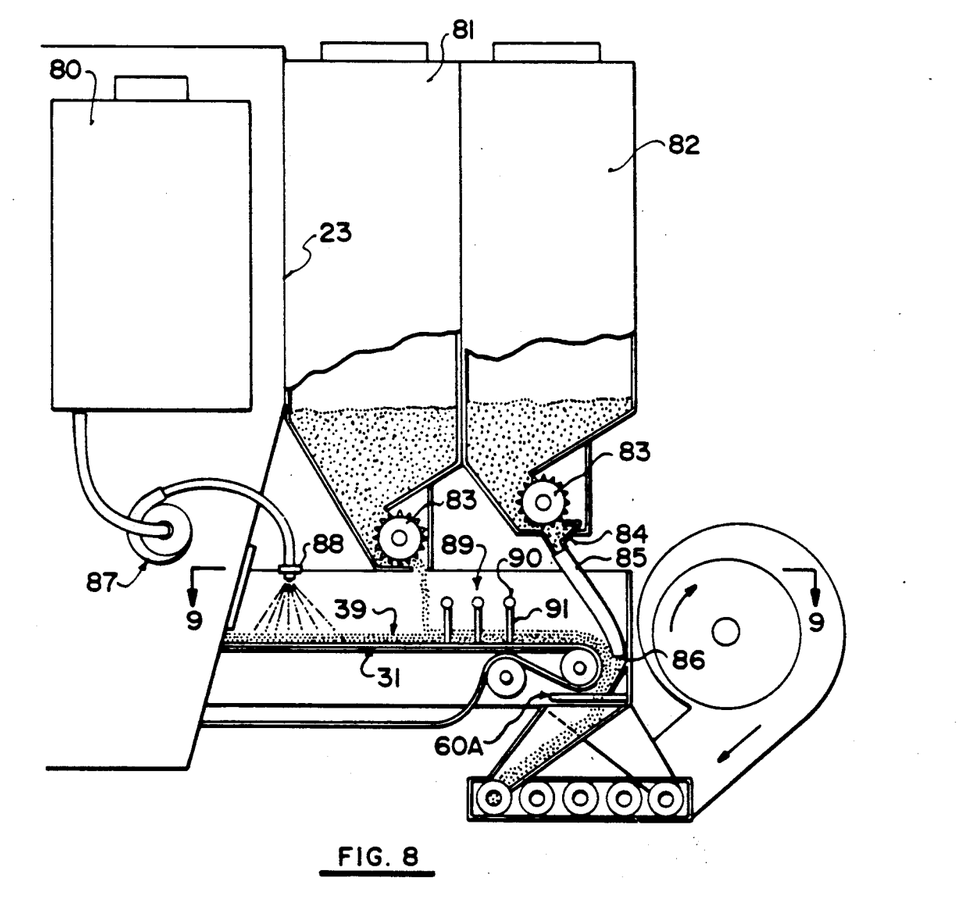
FIG. 8 is a cross-sectional view similar to that of FIG. 7 showing two supplementary hoppers for further materials and a liquid addition nozzle arrangement.
Figure 9:
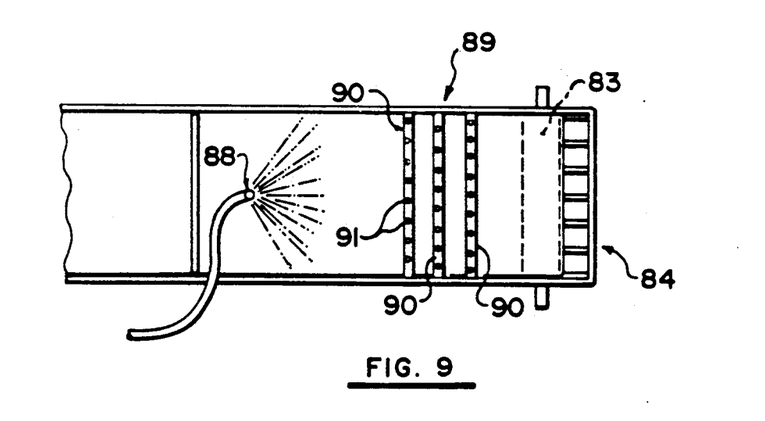
FIG. 9 is a view along the lines 9—9 of FIG. 8.

Turning now to FIGS. 8 and 9, additional or supplementary material can be added for a spreading action through the pneumatic distribution system previously described. FIG. 8 thus shows basically the portion of the device shown in FIG. 7 but in this case the additional supply systems for the supplementary materials are added which are omitted from FIG. 7 for convenience of illustration.

The supplementary material can be supplied from a liquid discharge tank 80, a first particulate material hopper 81 and a second particulate material hopper 82. The hoppers 81 and 82 are mounted on the end wall 23 of the hopper. The liquid tank 80 is mounted at suitable location for example on the side of the hopper. Each of the particulate material supply hoppers 81 and 82 includes a roller feed system 83 including a roller having a width substantially equal to the width of the belt upper run at 31. The roller has a plurality of ribs and grooves arranged longitudinally of the periphery so that rotation of the roller in an anti clockwise direction transports material from the bottom of the hopper over lip to fall in a curtain across the width of the belt. The details of this device are well known to one skilled in the art and have been used for many years on various types of pneumatic distribution systems.

In the case of the hopper 81, the roller is positioned above the belt so the material is allowed to fall directly from the roller onto the belt or rather onto the material layer 39 on top of the belt to form an additional layer as a supplement on top of the layer 39. As this layer is spread equally across the full width of the belt, this material is also properly separated by the fingers 60A and the ducts previously described for transmission along the booms for spreading action with the main particulate material from the main hopper.

The feed system from the hopper 82 discharges into a plurality of cups 84 which are spaced along the width of the roller 83 and thus actively divide the material into separate portions for discharge along separate pipes 85 each of which tapers to a nozzle 86 for discharge directly into one of the ducts on the main distribution system.

Therefore the material from the hopper 82 can be added into the main distribution system and can be spread with the main material from the main hopper.

The liquid from the tank 80 passes through a pump 87 to a high pressure nozzle 88 arranged to spread the liquid material evenly across the width of the material layer 39. The liquid is thus added to the material for spreading with the main distribution system. It is often required with a liquid distribution system that the liquid be arranged to contact a high property on of each of the particles of the particulate material to be distributed. For this purpose therefore downstream of the nozzle 88 is provided a rake system indicated at 89 including three transverse bars 90 and a plurality of vertical fingers 91 mounted on each of the bars and extending downwardly therefrom into contact with the layer 39 to a position at the top of the belt 31. As shown in FIG. 9 the fingers are offset from one bar to the next so that the material as it flows along the belt on top of the belt is moved and mixed by the action of the fingers within the layer of material. This causes the liquid to contact a maximum number of the particles of the layer 39. In this way no free liquid remains so that substantially all liquid is carried by the particles thus preventing drift of free liquid in the air stream which escapes form the spreader nozzles of the boom.

In some cases of use of the device all three of the supplementary material supply systems can be used. In other cases only one or only two of the supplementary supply systems may be used. In a yet further situation, the whole machine can be used to distribute material simply supplied from the third hopper 82 with the main system shut down. In cases therefore where a very low level of spreading rate is required, the material for distribution can be supplied in the hopper 82 in which case the belt is halted and all of the feed is controlled by the roller 83 and the duct 85. This enables the device to be very flexible in the type and quantities of material which can be distributed.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for spreading particulate material across the ground, comprising a tank for containing the material to be spread, a first boom and a second boom, each boom extending from a central position adjacent one end of the tank outwardly to a respective side of the tank, each boom including a plurality of pipes lying side by side in a common plane which is substantially horizontal, each pipe extending from an inner end adjacent the central position to an outer end spaced outwardly of the central position and having spreader means spaced outwardly from the central position for spreading across the ground the particulate material transported along the pipe, means for mounting the tank and the booms for movement in a direction substantially at right angles to the booms across the ground, the spreader means being located as staggered positions along the length of the booms such that the spreader means cooperate to spread the material across the width of the booms as the booms are moved across the ground, a first and a second endless feed belt means each having an upper run mounted within the tank such that the particulate material is carried on the upper run of the belt means from the tank in a layer on top of the upper run, means mounting the belt means such that the upper runs thereof lie in substantially the same horizontal plane for movement in mutually parallel directions outwardly from the tank at said one end thereof and at right angles to said booms, gate means for controlling the depth of the layer on the belt means so as to meter the amount of material carried thereby, each of said belt means having an end guide member at a discharge end of the belt means around which the upper run thereof turns to discharge the material to fall therefrom by gravity, each boom being associated with a respective one of the belt means so as to receive the particulate material deposited therefrom, fan means for generating airflow, manifold means communicating airflow from the fan means to each pipe for causing an airflow therealong from the inner end thereof to the spreader means for transportation of the particulate material therealong, each of the pipes of a respective one of the booms having a feed opening for receiving particulate material from the discharge end of the respective belt means, for each of the booms, the feed openings of the pipes thereof being staggered in a direction parallel to the discharge end of the respective belt means so as to receive material from separate parts of the respective belt means, and first and second guide means each for transferring the material from the discharge end of respective one of the belt means to the feed openings of respective one of the booms, each guide means comprising a plurality of rigid duct members arranged side by side across the width of the discharge end, each duct member communicating material directly to the feed opening of a respective one of the pipes and being formed by two side dividing walls separating each duct member from the next adjacent duct member and two end walls, the side dividing walls and end walls defining at an upper end of the duct member an open mouth into which the material falls from the discharge end, the side walls being arranged in spaced relation transversely to the discharge end so that the discharged material is divided into separate portions for transmission to the pipes, the end walls of each duct member including at least one end wall which is inclined to the vertical to guide the separate portion of material from a position directly beneath the discharge end to a position aligned with the feed opening of the respective pipe.

2. The invention according to claim 1 wherein the discharge end of the belt means is arranged to overlie substantially a longitudinal center line of the respective boom, the duct members being shaped so that the inclined end wall of a first one of the duct members is inclined forwardly and downwardly so as to guide the portion of material to a forwardmost one of the pipes and wherein a second one of the duct members has an inclined end wall inclined downwardly and rearwardly so as to guide the portion of material rearwardly to a rearwardmost one of the pipes.

3. The invention according to claim 2 wherein the first duct member is arranged at one end of the guide means and wherein the second duct member is arranged at the other end of the guide means.

4. The invention according to claim 1 wherein the end walls of each of the duct members converge from the open mouth to the feed opening of the respective pipe to form a funnel shape.

5. The invention according to claim 1 wherein said manifold means comprises a single manifold positioned between the booms and communicating with each of the pipes of both of the booms to generate said airflow therein.

6. The invention according to claim 1 wherein each pipe has the feed opening thereof arranged at the inner end thereof and includes a venturi positioned at said inner end and injecting air from said manifold means into said inner end axially of the pipe.

7. The invention according to claim 1 wherein there is provided a space between the belt means and wherein the fan means includes a duct passing between said belt means to said manifold means.

8. The invention according to claim 1 wherein said spreader means of each pipe includes a first spreader nozzle arranged at the end of the pipe and a second spreader nozzle mounted on the pipe at a position spaced inwardly of the outer end and arranged to separate from the pipe a portion of the material transported therein.

9. The invention according to claim 1 including means for spreading onto the belt across the width of the belt downstream of the gate means a supplementary material for spreading with the particulate material.

10. The invention according to claim 9 wherein said spreading means includes a nozzle for discharge of a liquid onto the particulate material on the belt and mixing means for engaging the particulate material on the belt so as to mix the liquid with the particulate material.

11. The invention according to claim 10 wherein the mixing means includes a rake member having a plurality of tines for engaging into the particulate material.

12. The invention according to claim 9 wherein the spreading means comprises a hopper for receiving a second particulate material and including roller discharge means for discharging a curtain of the material from the hopper across the width of the belt such that the curtain of the second particulate material falls on top of the material on the belt.

13. The invention according to claim 9 including a further hopper means for receiving a particulate material, a plurality of duct means each for guiding material from the further hopper means into a respective one of said duct members and metering means for feeding the particulate material from said further hopper means into said plurality of duct means.

14. Apparatus for spreading particulate material across the ground, comprising a tank for containing the material to be spread, a first boom and a second boom, each boom extending from a central position adjacent one end of the tank outwardly to a respective side of the tank, each boom including a plurality of pipes lying side by side in a common plane which is substantially horizontal, each pipe extending from an inner end adjacent the central position to an outer end spaced outwardly of the central position and having spreader means spaced outwardly from the central position for spreading across the ground the particulate material transported along the pipe, means for mounting the tank and the booms for movement in a direction substantially at right angles to the booms across the ground, the spreader means being located at staggered positions along the length of the booms such that the spreader means cooperate to spread the material across the width of the booms as the booms are moved across the ground, a first and a second endless feed belt means each having an upper run mounted within the tank such that the particulate material is carried on the upper run of the belt means from the tank in a layer on top of the upper run, means mounting the belt means such that the upper runs thereof lie in substantially the same horizontal plane for movement in mutually parallel directions outwardly from the tank at said one end thereof and at right angles to said booms, gate means for controlling the depth of the layer on the belt means so as to meter having an end guide member at a discharge end of the belt means having an end guide member at a discharge end of the belt means around which the upper run thereof turns to discharge the material to fall therefrom by gravity, each boom being positioned directly beneath the discharge end of a respective one of the belt means so as to receive the particulate material deposited therefrom, fan means for generating airflow, manifold means communicating airflow from the fan means to each pipe for causing an airflow therealong from the inner end thereof to the spreader means for transportation of the particulate material therealong, each of the pipes of a respective one of the booms having a feed opening for receiving particulate material from the discharge end of the respective belt means, first and second dividing means each associated with a respective one of the belts for dividing the discharged material into a plurality of separate portions and first and second guide means each including a plurality of ducts for transferring the separate portions of the material from the discharge end of respective one of the belt means to respective ones of the feed openings of a respective one of the booms.

15. The invention according to claim 14 wherein said manifold means comprises a single manifold positioned between the booms and directly communicating with each of the pipes of both of the booms to generate said airflow therein.

16. The invention according to claim 15 wherein each pipe has the feed opening thereof arranged at the inner end thereof and includes a venturi positioned at said inner end and injecting air from said manifold means into said inner end axially of the pipe.

17. The invention according to claim 15 wherein there is provided a space between the belt means and wherein the fan means includes a duct passing between said belt means to said manifold means.

18. The invention according to claim 14 wherein said spreader means of each pipe includes a first spreader nozzle arranged at the end of the pipe and a second spreader nozzle mounted on the pipe at a position spaced inwardly of the outer end and arranged to separate from the pipe a portion of the material transported therein.

19. The invention according to claim 14 wherein each of the booms has the pipes thereof arranged such that the feed openings are staggered in a direction parallel to the discharge end of the respective belt means so that each feed opening receives material from a separate part of the belt means substantially aligned therewith.

20. The invention according to claim 19 wherein the discharge end of the belt means is arranged to overlie substantially a longitudinal center line of the respective boom, the ducts being shaped so that an inclined end wall of a first one of the ducts is inclined forwardly and downwardly so as to guide the portion of material to a forwardmost one of the pipes and wherein a second one of the ducts has an inclined end wall inclined downwardly and rearwardly so as to guide the portion of material rearwardly to a rearwardmost one of the pipes.

21. The invention according to claim 20 wherein the first duct is arranged at one end of the guide means and wherein the second duct is arranged at the other end of the guide means.

22. The invention according to claim 14 wherein each guide means comprises said plurality of ducts, with each duct thereof being defined by substantially rigid walls extending downwardly from the discharge end of the respective belt means to a respective one of the feed opening such that the material is guided by the substantially rigid walls and falls by gravity therealong to the respective one of the feed openings.

* * * * *